(12) United States Patent
Kikuchi

(10) Patent No.: US 10,132,275 B2
(45) Date of Patent: Nov. 20, 2018

(54) INTERNAL COMBUSTION ENGINE

(71) Applicant: TOYOTA JIDOSHA KABUSHIKI KAISHA, Toyota-shi, Aichi-ken (JP)

(72) Inventor: Kazuki Kikuchi, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 79 days.

(21) Appl. No.: 15/437,606

(22) Filed: Feb. 21, 2017

(65) Prior Publication Data

US 2017/0306894 A1 Oct. 26, 2017

(30) Foreign Application Priority Data

Apr. 20, 2016 (JP) .................. 2016-084220

(51) Int. Cl.

| F02M 26/06 | (2016.01) |
|---|---|
| F02M 26/14 | (2016.01) |
| F02M 26/17 | (2016.01) |
| F02M 26/33 | (2016.01) |
| F02M 26/35 | (2016.01) |
| F02M 26/32 | (2016.01) |
| B01D 53/26 | (2006.01) |

(52) U.S. Cl.
CPC .......... *F02M 26/06* (2016.02); *B01D 53/268* (2013.01); *F02M 26/14* (2016.02); *F02M 26/17* (2016.02); *F02M 26/32* (2016.02); *F02M 26/33* (2016.02); *F02M 26/35* (2016.02)

(58) Field of Classification Search
CPC ........ F02M 26/06; F02M 26/14; F02M 26/17; F02M 26/32; F02M 26/33; F02M 26/35; B01D 53/268
See application file for complete search history.

(56) References Cited

U.S. PATENT DOCUMENTS

| 4,725,359 A | 2/1988 | Ray |
|---|---|---|
| 2006/0112928 A1 | 6/2006 | Coleman et al. |

FOREIGN PATENT DOCUMENTS

| DE | 102010029984 A1 | 12/2011 |
|---|---|---|
| JP | 2000-087811 A | 3/2000 |
| JP | 2006-226149 A | 8/2006 |
| JP | 2014-077371 A | 5/2014 |
| JP | 2015-209782 A | 11/2015 |

*Primary Examiner* — Audrey K Bradley
(74) *Attorney, Agent, or Firm* — Hunton Andrews Kurth LLP

(57) ABSTRACT

An internal combustion engine includes, in addition to an LPL-EGR system, two water vapor separation film modules for fresh air and for EGR gas. A module for fresh air is provided in an intake passage between a connecting portion with an EGR passage, and an air cleaner. A module for EGR gas is provided in the EGR passage on an upstream side of an EGR cooler. The module is connected to a pressure reducing pump through a suction passage. The module is connected to a pressure reducing pump through a suction passage.

9 Claims, 10 Drawing Sheets

INTERNAL COMBUSTION ENGINE

CROSS-REFERENCE TO RELATED APPLICATION

The present application claims priority under 35 U.S.C. § 119 to Japanese Patent Application No. 2016-084220, filed Apr. 20, 2016. The contents of this application are incorporated herein by reference in their entirety.

BACKGROUND

Technical Field

This invention relates to an internal combustion engine.

Background Art

Internal combustion engines with an EGR system are already known in which a part of exhaust gas that flows in an exhaust passage on a downstream side of a turbine of a turbocharger recirculates through an EGR passage to an intake passage on an upstream side of a compressor of the turbocharger. Such kind of EGR system is referred to as an "LPL-EGR system" to distinguish the system from an EGR system that causes a part of exhaust gas that flows in an exhaust passage on an upstream side of a turbine to recirculate through an EGR passage to an intake passage on a downstream side of a compressor.

With regard to an internal combustion engine with an LPL-EGR system, for example, JP 2015-209782A discloses an internal combustion engine that includes an intercooler which is provided in an intake passage on a downstream side relative to a compressor and which cools gas (fresh air or a mixed gas of fresh air and EGR gas) that was compressed by the compressor, and a groove which is formed in an inner wall surface of the intake passage that is on a lower side in the gravitational direction and is immediately downstream of the intercooler. When water vapor contained in the gas is cooled to its dew point as a result of passing through the intercooler, condensed water is generated. In this respect, according to the engine configuration described in JP 2015-209782A, condensed water that is generated accompanying cooling at the intercooler can be temporarily collected inside the aforementioned groove.

SUMMARY

In the engine configuration of JP 2015-209782A, when it is predicted that both EGR gas and condensed water will flow into cylinders which is a time at which the vehicle is decelerated during recirculation of EGR gas, control is performed that restricts the recirculation of EGR gas to an intake passage. The control itself is effective as a measure to counter a deterioration in combustion that occurs as a result of both EGR gas and condensed water flowing into cylinders during vehicle deceleration. However, because the configuration of the above described groove is one that temporarily collects condensed water and there is an upper limit to the capacity of the aforementioned groove, there is a considerable possibility that condensed water will overspill from the aforementioned groove and flow into a cylinder at an unintended timing and cause misfiring.

Further, in an LPL-EGR system, it is common for an EGR cooler that cools EGR gas to be provided in an EGR passage, and the same phenomenon as the above described phenomenon that occurs in the intercooler has been recognized in the EGR cooler. That is, condensed water is generated when water vapor in EGR gas is cooled to its dew point or below as a result of passing through the EGR cooler. Further, although not mentioned in JP 2015-209782A, when components contained in EGR gas dissolve in condensed water that is generated accompanying cooling at an EGR cooler, the condensed water acidifies and becomes a cause of corrosion of a compressor or intercooler located on the path of EGR gas that passed through the EGR cooler, that is, located in an intake passage.

However, because an EGR cooler is not disclosed in JP 2015-209782A, it is originally unclear whether acidification of condensed water that accompanies cooling of EGR gas at an EGR cooler can be suppressed according to the engine configuration of JP 2015-209782A. Further, such acidification can also arise in condensed water that is temporarily collected in the aforementioned groove. However, the engine configuration of JP 2015-209782A is a configuration that allows the generation of condensed water accompanying cooling of gas at an intercooler. Therefore, with the engine configuration of JP 2015-209782A, acidification of condensed water accompanying cooling of gas at an intercooler cannot be suppressed.

The present disclosure has been made in consideration of the above described problem, and an object of the present disclosure is to provide a novel internal combustion engine configuration that can suppress the own generation of condensed water accompanying cooling of gas at a cooling portion such as an intercooler or an EGR cooler.

An internal combustion engine according to the present disclosure includes a gas passage, a cooling portion, a water vapor separating portion and a pressure reducing portion. Gas that flows into a cylinder flows through the gas passage. The cooling portion is provided in the gas passage and cools gas that flows into the cylinder. The water vapor separating portion constitutes one part of the gas passage on an upstream side in a gas flow direction relative to the cooling portion, and includes a water vapor permeable film which, when installed so as to separate two spaces which have different partial water vapor pressures, allows water vapor to permeate from a space in which a partial water vapor pressure is higher toward a space in which a partial water vapor pressure is lower. The pressure reducing portion reduces a partial water vapor pressure of an outer space which is separated from an inner space into which gas from the gas passage flows by the water vapor permeable film so that a difference in partial water vapor pressures arises between the inner space and the outer space.

By reducing the partial water vapor pressure of the outer space so that a difference arises in the partial water vapor pressures between the inner space of the water vapor permeable film and the outer space which is separated from the inner space by the water vapor permeable film, water vapor included in gas that flows into a cylinder moves from the inner space to the outer space. That is, before cooling at the cooling portion, water vapor is removed from gas that flows into a cylinder.

The internal combustion engine according to the present disclosure may further include a pressure reduction amount adjustment portion. When it is predicted that a relative humidity on a downstream side in the gas flow direction relative to the cooling portion in the gas passage will be higher than 100%, the pressure reduction amount adjustment portion adjusts a pressure reduction amount of the partial water vapor pressure in the outer space that is reduced by the pressure reducing portion, so that the relative humidity becomes substantially equal to 100%.

When it is predicted that a relative humidity on a downstream side in the gas flow direction relative to the cooling portion in the gas passage will be higher than 100%, by adjusting a pressure reduction amount of the partial water vapor pressure in the outer space that is reduced by the pressure reducing portion, the minimum amount of water vapor that is required to suppress the generation of condensed water accompanying cooling of gas at the cooling portion moves from the inner space toward the outer space. Note that, in the present description the term "relative humidity becomes substantially equal to 100%" refers to not only a case in which the relative humidity becomes equal to 100% but also includes a case where although the relative humidity is lower than 100%, the relative humidity can be regarded as being equal to 100%.

In the internal combustion engine according to the present disclosure, a pressure reduction amount of the partial water vapor pressure in the outer space that is reduced by the pressure reducing portion may be increased as a humidity of fresh air that flows into the cylinder rises. Further, the pressure reduction amount may be increased as a pressure on a downstream side in the gas flow direction relative to a compressor of a turbocharger which is provided in the gas passage rises. Furthermore, the pressure reduction amount may be increased as a temperature of cooling water that is caused to exchange heat at the cooling portion with gas that flows into the cylinder decreases. Further, the pressure reduction amount may be increased as a flow rate of cooling water that is caused to exchange heat at the cooling portion with gas that flows into the cylinder rises.

In the internal combustion engine according to the present disclosure, the gas passage may be an EGR passage which connects an intake passage and an exhaust passage. In this case, the cooling portion is an EGR cooler that cools EGR gas which flows through the EGR passage, and the water vapor separating portion constitutes one part of the EGR passage on an upstream side in a gas flow direction relative to the EGR cooler of the EGR passage.

In the internal combustion engine according to the present disclosure, the gas passage may be an intake passage in which a compressor of a turbocharger is provided. In this case, the cooling portion is an intercooler that cools gas that is compressed at the compressor, and the water vapor separating portion constitutes one part of the intake passage on an upstream side in a gas flow direction relative to the compressor of the intake passage.

In the internal combustion engine according to the present disclosure, the gas passage may be intake passage in which a compressor of a turbocharger is provided, and an EGR passage which connects an upstream side of the intake passage in a gas flow direction relative to the compressor and a downstream side of an exhaust passage in the gas flow direction relative to a turbine of the turbocharger. In this case, the cooling portion is an intercooler which cools gas that is compressed by the compressor, and an EGR cooler which cools EGR gas that flows in the EGR passage, and the water vapor separating portion constitutes one part of the intake passage that is on an upstream side in the gas flow direction relative to a connecting portion with the EGR passage of the intake passage, and also constitutes one part of the EGR passage that is on an upstream side in the gas flow direction relative to the EGR cooler of the EGR passage.

According to the internal combustion engine of the present disclosure, the own generation of condensed water accompanying cooling of gas at a cooling portion such as an intercooler or an EGR cooler can be suppressed.

DESCRIPTION OF EMBODIMENTS

Figure 1:
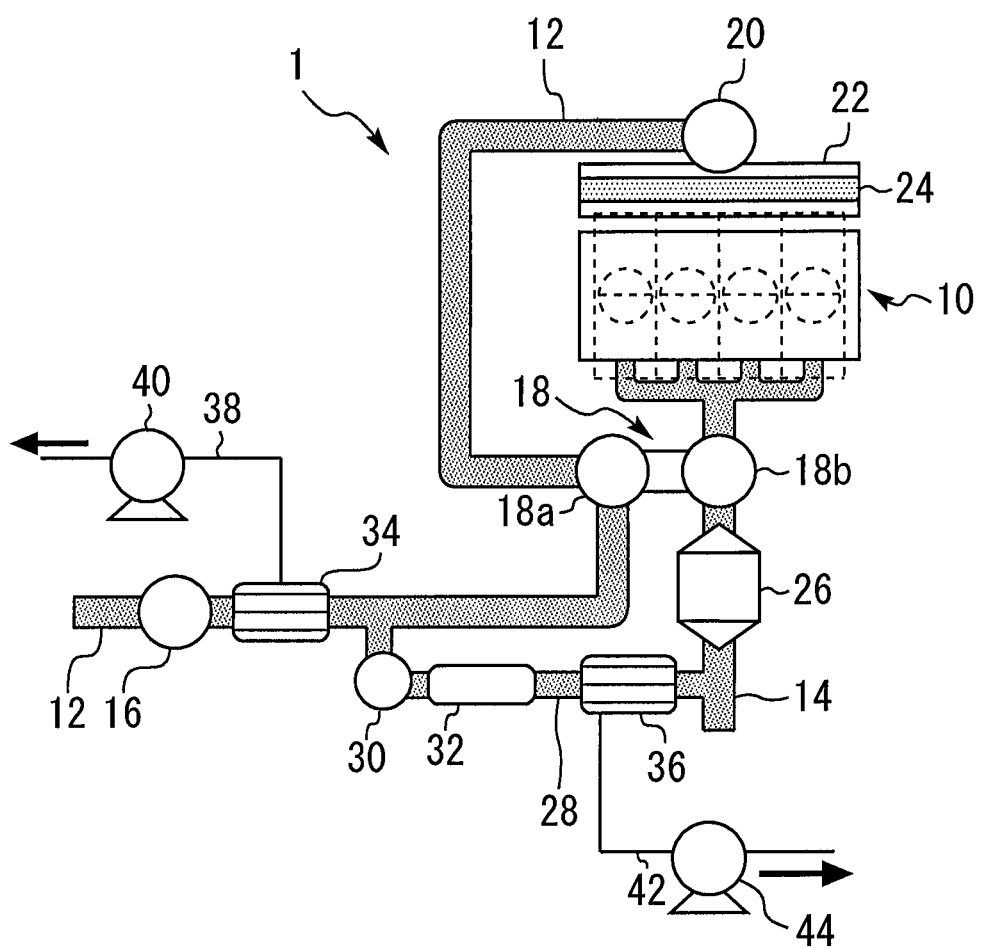
FIG. 1 is a schematic diagram illustrating the overall configuration of an internal combustion engine according to a first embodiment of the present disclosure.

Embodiments of the present disclosure are described hereunder based on the accompanying drawings. Note that elements that are common to the respective drawings are denoted by the same reference characters and a duplicate description thereof is omitted. Further, the present disclosure is not intended to be limited by the embodiments described hereunder.

First Embodiment

First, a first embodiment of the present disclosure will be described referring to FIG. 1 to FIG. 7.

[Description of Configuration of Internal Combustion Engine]

FIG. 1 is a schematic diagram illustrating the overall configuration of an internal combustion engine according to the first embodiment of the present disclosure. An internal combustion engine 1 illustrated in FIG. 1 is an internal combustion engine with an LPL-EGR system that is to be mounted in a vehicle or the like. The internal combustion engine 1 includes an inline four-cylinder engine body 10. However, the number of cylinders and the arrangement of the cylinders of the engine body 10 are not limited thereto. An intake passage 12 and an exhaust passage 14 are connected to each cylinder of the engine body 10.

An air cleaner 16 is mounted in the vicinity of an inlet of the intake passage 12. A compressor 18*a* of a turbocharger 18 is installed downstream of the air cleaner 16. The compressor 18*a* is driven by rotation of a turbine 18*b* that is disposed in the exhaust passage 14. An electronically controlled throttle valve 20 is provided in the intake passage 12 at a position that is on a downstream side relative to the compressor 18a. A surge tank 22 that is connected to intake ports (omitted from the drawings) of the respective cylinders is provided in the intake passage 12 at a position that is on a downstream side relative to the throttle valve 20. An intercooler 24 that cools gas which was compressed by the compressor 18a is contained in the surge tank 22.

A catalyst (as one example, a three-way catalyst) 26 that purifies exhaust gas from each cylinder of the engine body 10 is arranged at a position on a downstream side relative to the turbine 18b in the exhaust passage 14. One end of an EGR passage 28 is connected to the exhaust passage 14 on a downstream side relative to the catalyst 26. The other end of the EGR passage 28 is connected to the intake passage 12 on an upstream side relative to the compressor 18a. An EGR valve 30 is provided partway along the EGR passage 28. When the EGR valve 30 is opened, one part of exhaust gas that flows through the exhaust passage 14 is introduced into the intake passage 12 as EGR gas. An EGR cooler 32 that cools EGR gas that flows through the EGR passage 28 is provided in the EGR passage 28 on an upstream side relative to the EGR valve 30 (upstream side in the flow direction of the EGR gas).

The turbocharger 18, the intercooler 24, the EGR passage 28, the EGR valve 30 and the EGR cooler 32 constitute an LPL-EGR system. In addition to this LPL-EGR system, the internal combustion engine 1 of the present embodiment is equipped with two water vapor separation film modules which are for fresh air and for EGR gas. A module 34 for fresh air is provided in the intake passage 12 between a connecting portion with the EGR passage 28 and the air cleaner 16. On the other hand, a module 36 for EGR gas is provided in the EGR passage 28 on the upstream side relative to the EGR cooler 32. The module 34 and the module 36 share the same basic configuration. The module 34 is connected to a pressure reducing pump 40 through a suction passage 38. The module 36 is connected to a pressure reducing pump 44 through a suction passage 42.

[Description of Configuration of Water Vapor Separation Film Module]

Figure 2:
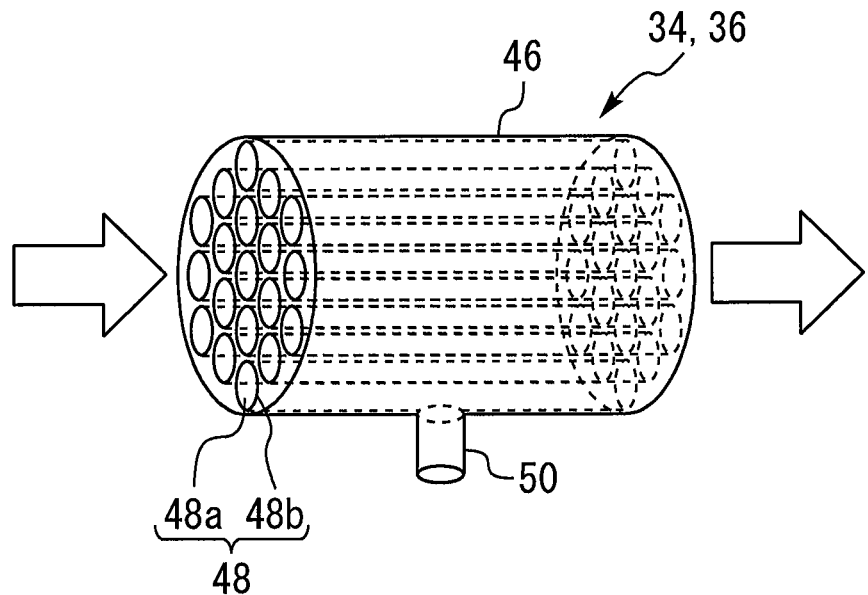
FIG. 2 is a schematic diagram illustrating the configuration of modules 34 and 36.

FIG. 2 is a schematic diagram illustrating the configuration of the modules 34 and 36. As shown in FIG. 2, the modules 34 and 36 include a circular tubular housing 46, and a large number of tubular films 48 that are filled inside the housing 46. The housing 46 is constituted by, for example, a resin, and a discharge port 50 that is connected to one end of the suction passages 38 and 42 shown in FIG. 1 is formed in a side face thereof. The side face of the housing 46 of the module 34 is contiguous with an outer wall surface of the intake passage 12, and the side face of the housing 46 of the module 36 is contiguous with an outer wall surface of the EGR passage 28. That is, the side face of the housing 46 of the module 34 constitutes one part of the outer wall surface of the intake passage 12, and the side face of the housing 46 of the module 36 constitutes one part of the outer wall surface of the EGR passage 28. The tubular films 48 are hollow fiber films made from, for example, hydrophilic macromolecules or zeolite, and include an inner wall surface 48a and an outer wall surface 48b. The respective tubular films 48 are gathered together densely and in parallel with each other along the opening direction (direction of arrows shown in FIG. 2) of the housing 46, and are integrally fixed to the housing 46.

Figure 3:
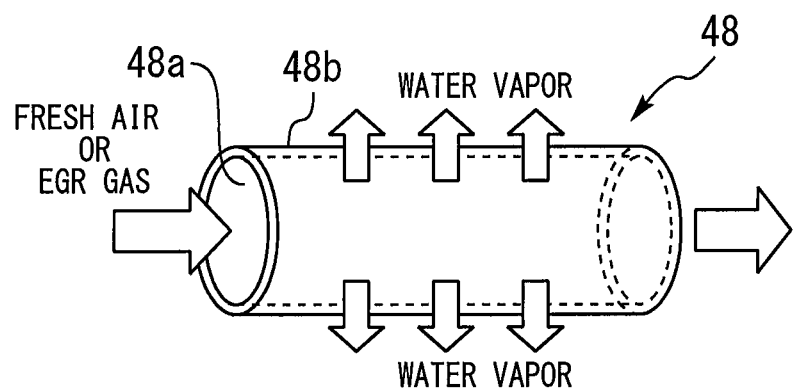
FIG. 3 is a view for describing a flow of gas that flows into the modules 34 and 36.

Fresh air that flows into the module 34 from one end of the housing 46, or EGR gas that flows into the module 36 from one end of the housing 46 is discharged from the other end of the housing 46. FIG. 3 is a view for describing the flow of gas that flows into the modules 34 and 36, in which one among the large number of tubular films 48 shown in FIG. 2 is illustrated. As indicated by thick arrows in FIG. 3, gas that flows into the tubular film 48 flows through the inner side of the inner wall surface 48a and proceeds in the downstream direction. Further, as indicated by thin arrows in the film thickness direction, part of water vapor that is included in the gas that flows through the inside of the inner wall surface 48a moves through the interior of the tubular film 48 from the inner wall surface 48a towards the outer wall surface 48b.

Figure 4:
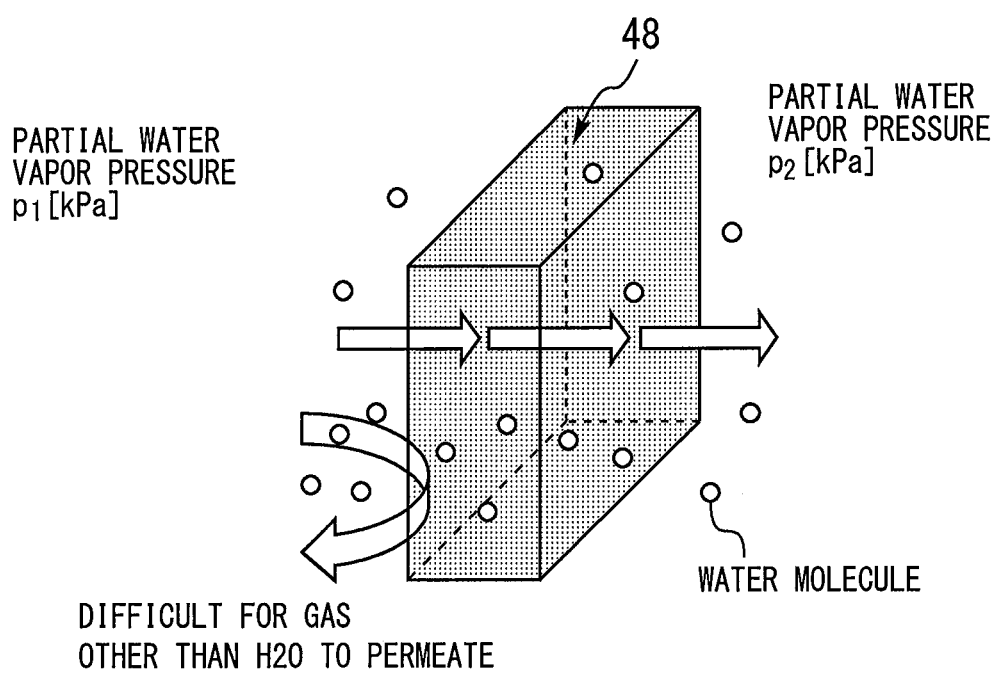
FIG. 4 is a view for describing a permeation principle with respect to water vapor at a tubular film 48.

The reason that part of the water vapor moves in the film thickness direction of the tubular film 48 is that a difference arises between partial water vapor pressures in two spaces into which the tubular film 48 is separated. FIG. 4 is a view for describing a permeation principle with respect to water vapor in the tubular film 48. One part of the tubular film 48 illustrated in FIG. 3 is schematically shown in FIG. 4. When a partial water vapor pressure $p_1$ of a left space of the tubular film 48 illustrated in FIG. 4 is higher than a partial water vapor pressure $p_2$ of a right space, a concentration gradient arises inside the film as a result of water vapor dissolving on the surface of the tubular film 48 that forms an interface with the left space, and this concentration gradient serves as a driving force under which water vapor (more exactly, water molecules) moves from the left space side to the right space side. Movement of the water vapor continues until a partial water vapor pressure difference $\Delta p$ ($=p_1-p_2$) between the two spaces disappears. Note that the tubular film 48 is provided with a configuration such that it is difficult for a gas other than water vapor to move inward, and therefore basically only water vapor moves between the two spaces into which the tubular film 48 is separated.

Water Vapor Separation in First Embodiment

In the present embodiment, the pressure reducing pumps 40 and 44 shown in FIG. 1 are driven and gas amounts that are sent to the suction passages 38 and 42 on the downstream side from the pressure reducing pumps 40 and 44 are kept at a predetermined amount. Consequently, during driving of the pressure reducing pumps 40 and 44, the partial water vapor pressure is lower in a space surrounding the outer wall surface 48b than in a space surrounded by the inner wall surface 48a that is shown in FIG. 3. In the module 34, a part of water vapor included in fresh air that flows through the inside of the inner wall surface 48a moves towards the outer wall surface 48b from the inner wall surface 48a. The water vapor that moved to the space surrounding the outer wall surface 48b then flows into the suction passage 38 through the discharge port 50. This similarly occurs in the module 36 also. That is, in the module 36, a part of water vapor included in EGR gas that flows through the inside of the inner wall surface 48a moves to the space surrounding the outer wall surface 48b and then flows into the suction passage 42 through the discharge port 50.

The water vapor that flowed from inside the inner wall surface 48a to the suction passage 38 (or the suction passage 42) is discharged as it is to the downstream side by the pressure reducing pump 40 (or the pressure reducing pump 44) in the suction passage 38 (or the suction passage 42) or is collected on the downstream side. On the other hand, water vapor that did not flow into the suction passage 38, that is, water vapor that did not move from the inner wall surface 48a towards the outer wall surface 48b of the module 34 flows through the inside of the inner wall surface 48a together with fresh air and moves towards the compressor 18a that is located downstream of the module 34. Likewise, water vapor that did not flow into the suction passage 42, that is, water vapor that did not move from the inner wall surface 48a towards the outer wall surface 48b of the module 36 flows through the inside of the inner wall surface 48a together with EGR gas and moves towards the EGR cooler 32 that is located downstream of the module 36.

Figure 5:
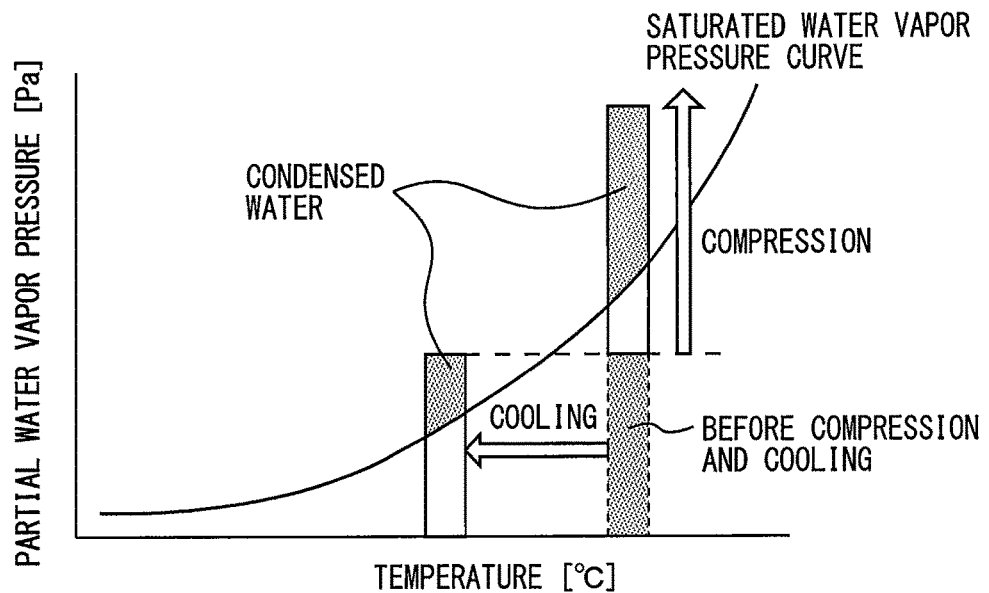
FIG. 5 is a view illustrating a principle regarding generation of condensed water.

FIG. 5 is a view illustrating a principle regarding generation of condensed water. When gas having a relative humidity of less than 100% which is indicated in this drawing by "before compression and cooling" is cooled under an isobaric condition, when the partial water vapor pressure of the gas drops and exceeds the saturated water vapor pressure, condensed water is generated. When gas "before compression and cooling" is compressed under an isothermal condition, condensed water is also generated when the partial water vapor pressure of the gas rises and exceeds the saturated water vapor pressure. In accordance with this principle, condensed water is generated when the partial water vapor pressure in gas (refers to fresh air or a mixed gas of fresh air and EGR gas. Hereunder, a mixed gas of fresh air and EGR gas is simply referred to as "mixed gas". Further, fresh air or a mixed gas is referred to as "gas (fresh air or mixed gas).") exceeds the saturated water vapor pressure accompanying cooling at the intercooler 24 shown in FIG. 1. Condensed water is also generated when the partial water vapor pressure in EGR gas exceeds the saturated water vapor pressure accompanying cooling at the EGR cooler 32, and when the partial water vapor pressure in gas (fresh air or mixed gas) exceeds the saturated water vapor pressure accompanying compression at the compressor 18a.

Figure 6:
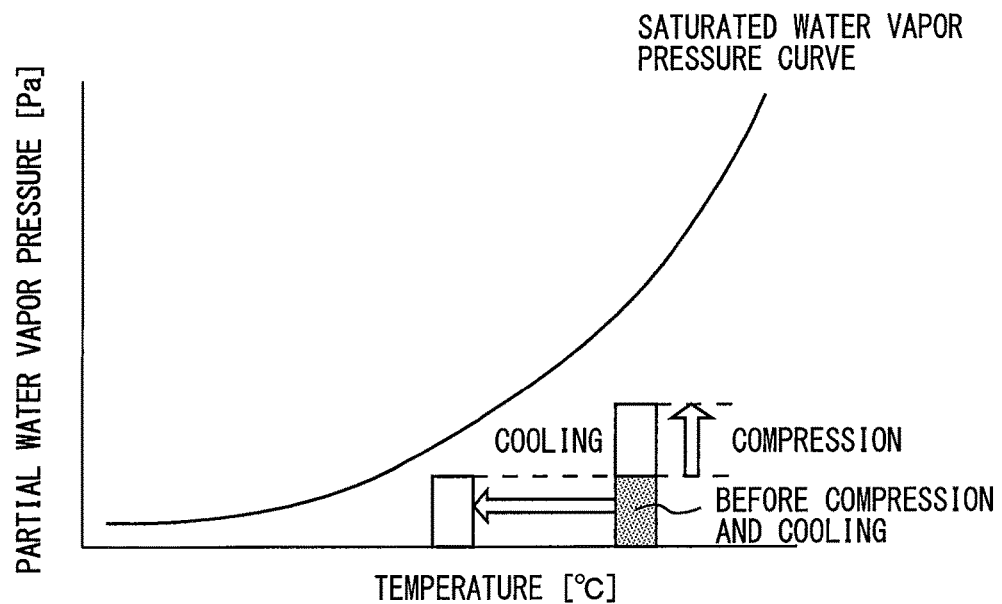
FIG. 6 is a view for describing an effect obtained by the configuration of the first embodiment of the present disclosure.

In this respect, since the tubular film 48 which has been described referring to FIG. 2 and FIG. 3 has a configuration such that it is difficult for a gas other than water vapor to permeate therethrough, driving the pressure reducing pumps 40 and 44 allows water vapor to be selectively removed from gas (fresh air or mixed gas) prior to flowing into the intercooler 24 or from EGR gas prior to flowing into the EGR cooler 32. FIG. 6 is a view for describing the effects of the configuration of the first embodiment of the present disclosure. As will be understood by comparing FIG. 5 and FIG. 6, according to the present embodiment the partial water vapor pressure in gas "before compression and cooling" which is in a state in which condensed water is likely to be generated after compression or after cooling can be lowered in advance. Therefore, the generation of condensed water accompanying compression at the compressor 18a or cooling at the intercooler 24 or the EGR cooler 32 which are shown in FIG. 1 can be suppressed.

Note that, in the above described first embodiment, the intake passage 12 and the EGR passage 28 illustrated in FIG. 1 correspond to "gas passage" of the present disclosure, the intercooler 24 and the EGR cooler 32 illustrated in FIG. 1 correspond to "cooling portion" of the present disclosure, the tubular film 48 illustrated in FIG. 2 and FIG. 3 correspond to "water vapor permeable film" of the present disclosure, the modules 34 and 36 illustrated in FIG. 2 correspond to "water vapor separating portion" of the present disclosure, and the suction passages 38 and 42 and the pressure reducing pumps 40 and 44 illustrated in FIG. 1 correspond to "pressure reducing portion" of the present disclosure.

Other Configuration Example of Pressure Reducing Portion

Figure 7:
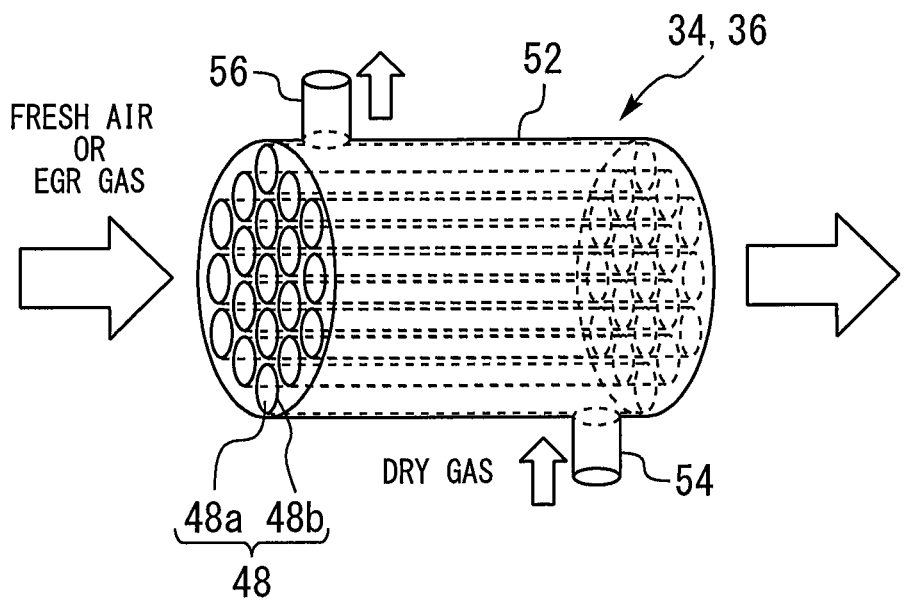
FIG. 7 is a view for describing another means for relatively lowering a partial water vapor pressure in a space surrounding an outer wall surface 48*b*.

In this connection, in the above described first embodiment the partial water vapor pressure in the space surrounding the outer wall surface 48b is made lower than in the space surrounded by the inner wall surface 48a by driving the pressure reducing pumps 40 and 44 that are combined with the modules 34 and 36. However, the partial water vapor pressure in the space surrounding the outer wall surface 48b may be relatively lowered by utilizing different means from the pressure reducing pumps 40 and 44. FIG. 7 is a view for describing other means for relatively lowering the partial water vapor pressure in the space surrounding the outer wall surface 48b. A housing 52 illustrated in FIG. 7 is provided in the modules 34 and 36 instead of the housing 46 illustrated in FIG. 2. A supply port 54 and a discharge port 56 are formed in a side face of the housing 52. The supply port 54 is connected to a gas supply apparatus (unshown) that sends dry gas (purge gas), and the discharge port 56 is opened to the atmosphere. The configuration of the tubular films 48 of the modules 34 and 36 is the same as the configuration in the foregoing description regarding FIG. 3.

Because the tubular film 48 has a film configuration such that it is difficult for a gas other than water vapor to move through the interior thereof as described above referring to FIG. 4, dry gas that flows into the housing 52 from the supply port 54 when the gas supply apparatus is driven flows along the outer wall surface 48b towards the discharge port 56 without moving through the inside of the tubular film 48. Since the partial water vapor pressure in the space surrounding the outer wall surface 48b becomes lower than the partial water vapor pressure in the space surrounded by the inner wall surface 48a as a result of the dry gas flowing along the outer wall surface 48b, the movement of water vapor that is described above referring to FIG. 4 occurs. Thus, the partial water vapor pressure in the space surrounding the outer wall surface 48b can also be relatively lowered by driving a gas supply apparatus that is combined with the modules 34 and 36.

Other Configuration Example of Modules

The foregoing first embodiment was described on the premise that the large number of tubular films 48 included in the modules 34 and 36 are hollow fiber-type films. However, instead of a hollow fiber-type module structure it is possible to adopt a honeycomb monolith-type module structure, a flat film-type module structure or a shell-and-tube-type module structure. Similarly to the hollow fiber-type module structure, various modifications can be made to the module structure as long as the module structure has a function that can separate only water vapor from fresh air and from EGR gas.

Other Configuration Example of Internal Combustion Engine

The foregoing first embodiment was described on the premise of using an LPL-EGR system. However, the present disclosure can also be applied to a non-EGR supercharging system having a configuration that, relative to the LPL-EGR system, excludes the EGR passage 28, the EGR cooler 32 and the like shown in FIG. 1, or to a non-supercharging EGR system having a configuration that, relative to the LPL-EGR system, excludes the turbocharger 18 and the intercooler 24 and the like shown in FIG. 1.

Specifically, when a non-EGR supercharging system is taken as a premise, the engine configuration includes only the module 34 and does not include the module 36. In this case, by driving the pressure reducing pump 40 that is combined with the module 34, the generation of condensed water accompanying compression at the compressor 18a or cooling at the intercooler 24 shown in FIG. 1 can be suppressed. On the other hand, when a non-supercharging EGR system is taken as a premise, the engine configuration includes the modules 34 and 36 similarly to the above described first embodiment, or includes only the module 36. When the engine configuration includes the modules 34 and 36, similarly to the above described first embodiment, the generation of condensed water accompanying cooling at the EGR cooler 32 can be suppressed by driving the pressure reducing pumps 40 and 44 that are combined with the two modules. When the engine configuration includes only the module 36, the generation of condensed water accompanying cooling at the EGR cooler 32 can be suppressed by driving the pressure reducing pump 44 that is combined with the module 36.

Other Configuration Example of Pressure Reducing Pump

In the above described first embodiment, a gas amount that is sent to the suction passages 38 and 42 on the downstream side relative to the pressure reducing pumps 40 and 44 shown in FIG. 1 is kept at a predetermined amount. However, a configuration may also be adopted in which a gas amount that is sent to the suction passages 38 and 42 on the downstream side relative to the pressure reducing pumps 40 and 44 is made variable.

For example, since condensed water is more liable to be generated in the intercooler 24 and the EGR cooler 32 as the humidity of fresh air increases, a configuration may be adopted so that the higher that the humidity of fresh air is, the greater the gas amount that is sent to the suction passages 38 and 42. Further, since condensed water is more likely to be generated in the intercooler 24 and the EGR cooler 32 as the pressure (supercharging pressure) of gas which is on the downstream side relative to the compressor 18a and on the upstream side of the intercooler 24 increases, a configuration may be adopted so that the higher that the supercharging pressure is, the greater the amount of gas that is sent to the suction passages 38 and 42.

Further, since the lower the temperature of cooling water that is caused to exchange heat with a gas (fresh air or mixed gas) in the intercooler 24 is, the more likely it is that condensed water will be generated, a configuration may be adopted so that the lower the temperature of the cooling water is, the greater the amount of gas that is sent to the suction passage 38. Since it becomes more likely for condensed water to be generated as the flow rate of this heat transfer medium increases, the gas amount that is sent to the suction passage 38 may be increased as the flow rate of the cooling water increases.

Further, since the lower the temperature of cooling water that exchanges heat with EGR gas in the EGR cooler 32 is, the more likely it is that condensed water will be generated, a configuration may be adopted so that the lower the temperature of the cooling water is, the greater the gas amount that is sent to the suction passage 42. In addition, since it becomes more likely for condensed water to be generated as the flow rate of this heat transfer medium increases, the gas amount that is sent to the suction passage 42 may be increased as the flow rate of the cooling water increases.

Second Embodiment

Next, a second embodiment of the present disclosure will be described referring to FIG. 8 to FIG. 12.

Description of Configuration of Internal Combustion Engine

Figure 8:
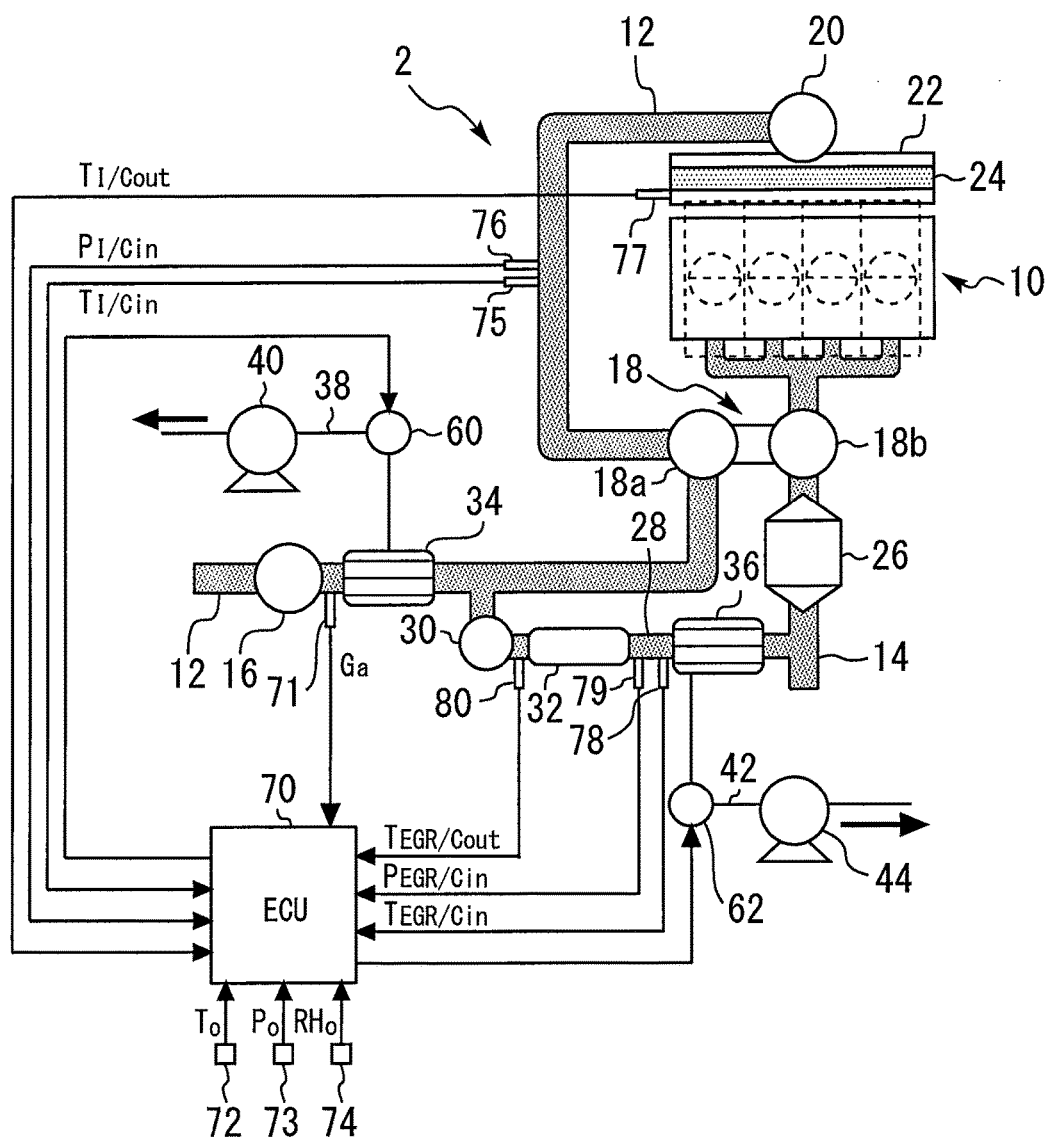
FIG. 8 is a schematic diagram illustrating the overall configuration of an internal combustion engine according to a second embodiment of the present disclosure.

FIG. 8 is a schematic diagram illustrating the overall configuration of an internal combustion engine according to the second embodiment of the present disclosure. An internal combustion engine 2 illustrated in FIG. 8 shares the same configuration as the internal combustion engine 1 illustrated in FIG. 1 with respect to the LPL-EGR system and the configuration equipped with the two water vapor separation film modules (that is, the modules 34 and 36) for fresh air and EGR gas. Therefore, a description of these configurations is omitted here.

The internal combustion engine 2 illustrated in FIG. 8 includes a control valve 60 that is provided in the suction passage 38 on an upstream side relative to the pressure reducing pump 40, a control valve 62 that is provided in the suction passage 42 on an upstream side relative to the pressure reducing pump 44, and an ECU 70 that controls the opening degrees of these control valves 60 and 62. The control valves 60 and 62 are both electronically controlled valves, and are connected to an output side of the ECU 70. Similarly to the above described first embodiment, in the present embodiment also a gas amount that is sent towards the downstream side relative to the pressure reducing pumps 40 and 44 is kept at a predetermined amount.

Various sensors are connected to an input side of the ECU 70 shown in FIG. 8. The various sensors include an air flow meter 71 that is mounted in the vicinity of the air cleaner 16 and detects a fresh air flow rate Ga, a temperature sensor 72 that detects an atmospheric temperature $T_0$, a pressure sensor 73 that detects an atmospheric pressure $P_0$, and a humidity sensor 74 that detects an atmospheric humidity RH. The various sensors also include a plurality of temperature sensors and a plurality of pressure sensors that detect a temperature and a pressure of gas (fresh air or mixed gas) that flows into the cylinders of the engine body 10.

Specifically, these sensors are as follows. That is, a temperature sensor 75 that detects a temperature (hereunder, referred to as "pre-I/C temperature") $T_{I/C_{in}}$ of gas at a position that is on a downstream side of the compressor 18a and on an upstream side of the intercooler 24, a pressure sensor 76 that detects a pressure (hereunder, referred to as "pre-I/C temperature") $P_{I/C_{in}}$ of gas at a position that is on the downstream side of the compressor 18a and on the upstream side of the intercooler 24, a temperature sensor 77 that detects a temperature (hereunder, referred to as "post-I/C temperature") $T_{I/C_{out}}$ of gas at a position that is on a downstream side of the intercooler 24, a temperature sensor 78 that detects a temperature (hereunder, referred to as "pre-EGR/C temperature") $T_{EGR/C_{in}}$ of gas on an upstream side of the EGR cooler 32, a pressure sensor 79 that detects a pressure (hereunder, referred to as "pre-EGR/C pressure") $P_{EGR/C_{in}}$ of gas on the upstream side of the EGR cooler 32, and a temperature sensor 80 that detects a temperature (hereunder, referred to as "post-EGR/C temperature") $T_{EGR/C_{out}}$ of gas on a downstream side of the EGR cooler 32.

Water Vapor Separation in Second Embodiment

In the above described first embodiment, water vapor is selectively removed from gas (fresh air or mixed gas) before flowing into the intercooler 24 and from EGR gas before flowing into the EGR cooler 32 by driving the pressure reducing pumps 40 and 44 that are combined with the modules 34 and 36. However, when the partial water vapor pressure in gas (fresh air or mixed gas) that flows into the intercooler 24 or the like (that is, the partial water vapor pressure in gas "before compression and cooling" shown in FIG. 5) is originally high, there is a possibility that condensed water will be generated even though water vapor was removed from the fresh air or EGR gas. Further, because the specific heat of water is comparatively large, if water vapor of an amount that is more than necessary is separated at the modules 34 and 36, the combustion temperature in the cylinders will rise and the generated amount of NOx will increase.

Therefore, in the present embodiment the partial water vapor pressure in gas (fresh air or mixed gas) downstream of the intercooler 24 and the partial water vapor pressure in EGR gas downstream of the EGR cooler 32 are predicted by the ECU 70. When the predicted partial water vapor pressure in gas (fresh air or mixed gas) downstream of the intercooler 24 is higher than the saturated water vapor pressure downstream of the intercooler 24, the opening degree of the control valve 60 is adjusted so that the partial water vapor pressure becomes substantially equal to the saturated water vapor pressure. That is, when it is predicted that the relative humidity downstream of the intercooler 24 will be higher than 100%, the opening degree of the control valve 60 is adjusted so that the relative humidity becomes substantially equal to 100%. Note that, in the present description the term "partial water vapor pressure becomes substantially equal to the saturated water vapor pressure" refers to not only a case in which the partial water vapor pressure is exactly equal to the saturated water vapor pressure, but also includes a case in which although the partial water vapor pressure is lower than the saturated water vapor pressure, the partial water vapor pressure can be regarded as being equal to the saturated water vapor pressure.

Further, in the present embodiment, even if the predicted partial water vapor pressure in gas (fresh air or mixed gas) downstream of the intercooler 24 is equal to or less than the saturated water vapor pressure downstream of the intercooler 24, when the predicted partial water vapor pressure in EGR gas downstream of the EGR cooler 32 is higher than the saturated water vapor pressure downstream of the EGR cooler 32, the opening degree of the control valve 62 is adjusted so that the partial water vapor pressure becomes substantially equal to the saturated water vapor pressure. That is, even when it is predicted that the relative humidity downstream of the intercooler 24 will be less than or equal to 100%, when it is predicted that the relative humidity downstream of the EGR cooler 32 will be higher than 100%, the opening degree of the control valve 62 is adjusted so that the relative humidity becomes substantially equal to 100% downstream of the EGR cooler 32.

Figure 9:
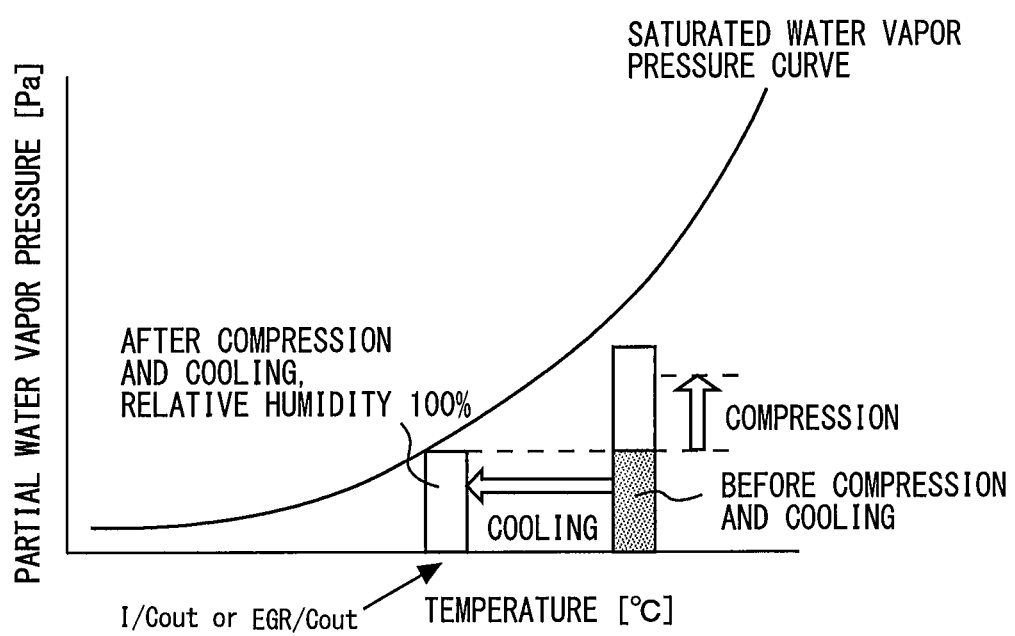
FIG. 9 is a view for describing an overview of valve control according to the second embodiment of the present disclosure.

FIG. 9 is a view for describing an overview of valve control according to the second embodiment of the present disclosure. A temperature $T_{f/Cout}$ shown on the abscissa axis in FIG. 9 represents the temperature of gas (fresh air or mixed gas) that flowed out from the intercooler 24 (that is, a post-I/C temperature). Further, a temperature $T_{EGR/Cout}$ represents the temperature of EGR gas that flowed out from the EGR cooler 32 (that is, a post-EGR/C temperature). As described above referring to FIG. 6, if the partial water vapor pressure in gas "before compression and cooling" is lowered in advance, the generation of condensed water accompanying compression at the compressor 18a or cooling at the intercooler 24 or EGR cooler 32 can be suppressed.

The method of valve control according to the present embodiment is basically the same as the method described above referring to FIG. 6. However, in the valve control according to the present embodiment, when it is predicted that the partial water vapor pressure in gas (fresh air or mixed gas) after cooling at the intercooler 24 will be higher than the saturated water vapor pressure at the post-I/C temperature $T_{f/Cout}$, the opening degree of the control valve 60 is adjusted so that the partial water vapor pressure in the aforementioned gas (fresh air or mixed gas) becomes substantially equal to the saturated water vapor pressure at the post-I/C temperature $T_{f/Cout}$. By adjusting the opening degree of the control valve 60 in this way, the necessary minimum amount of water vapor is separated from the gas (fresh air or mixed gas) prior to cooling at the intercooler 24, and thus an increase in the generated amount of NOx can be suppressed while suppressing the generation of condensed water accompanying cooling at the intercooler 24.

Further, according to the valve control of the present embodiment, even when it is predicted that the partial water vapor pressure in gas (fresh air or mixed gas) after cooling at the intercooler 24 will be equal to or less than the saturated water vapor pressure at the post-I/C temperature $T_{f/Cout}$, when it is predicted that the partial water vapor pressure in EGR gas after cooling at the EGR cooler 32 will be higher than the saturated water vapor pressure at the post-EGR/C temperature $T_{EGR/Cout}$, the opening degree of the control valve 62 is adjusted so that the partial water vapor pressure in the aforementioned EGR gas becomes substantially equal to the saturated water vapor pressure at the post-I/C temperature $T_{f/Cout}$. By adjusting the opening degree of the control valve 62 in this way, the necessary minimum amount of water vapor is separated from the EGR gas prior to cooling at the EGR cooler 32, and thus the generation of condensed water accompanying cooling at the EGR cooler 32 can also be suppressed.

Note that, as mentioned in the description of FIG. 6, condensed water is sometimes generated accompanying compression at the compressor 18a. Therefore, the principle of the valve control can also be applied to gas that flows out from the compressor 18a and reflected in adjustment of the opening degree of the control valve 60. However, for reasons such as the fact that gas (fresh air or mixed gas) that flows through the intake passage 12 flows into the intercooler 24 immediately after being compressed at the compressor 18a, and the fact that a decrease in the partial water vapor pressure accompanying cooling at the intercooler 24 has a stronger influence on generation of condensed water than a rise in the partial water vapor pressure that accompanies compression at the compressor 18a, the valve control according to the present embodiment does not focus on gas that flows out from the compressor 18a.

[Specific Control Method]

Figure 10:
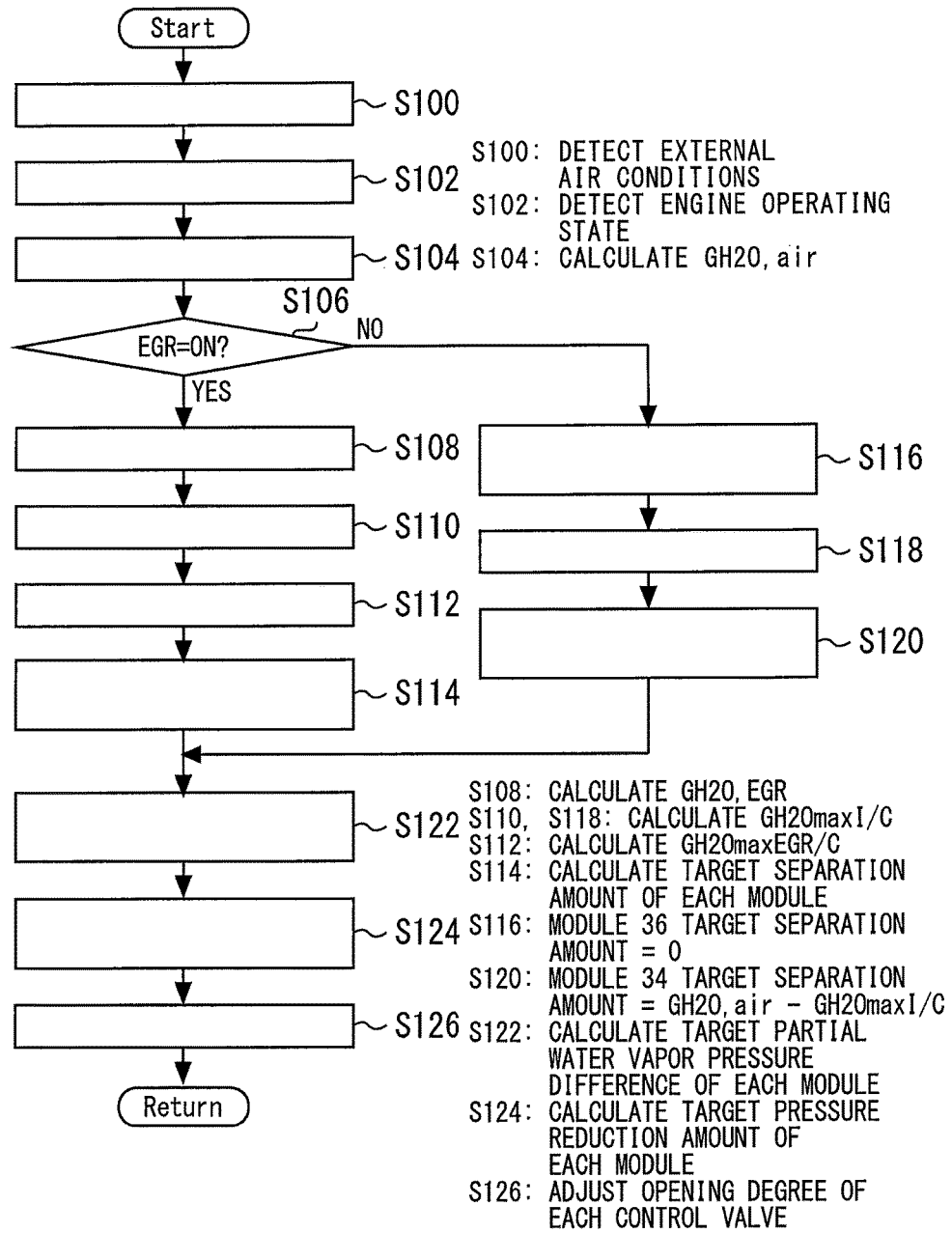
FIG. 10 is a flowchart illustrating an example of processing executed by an ECU 70 in the second embodiment of the present disclosure.
Figure 11:
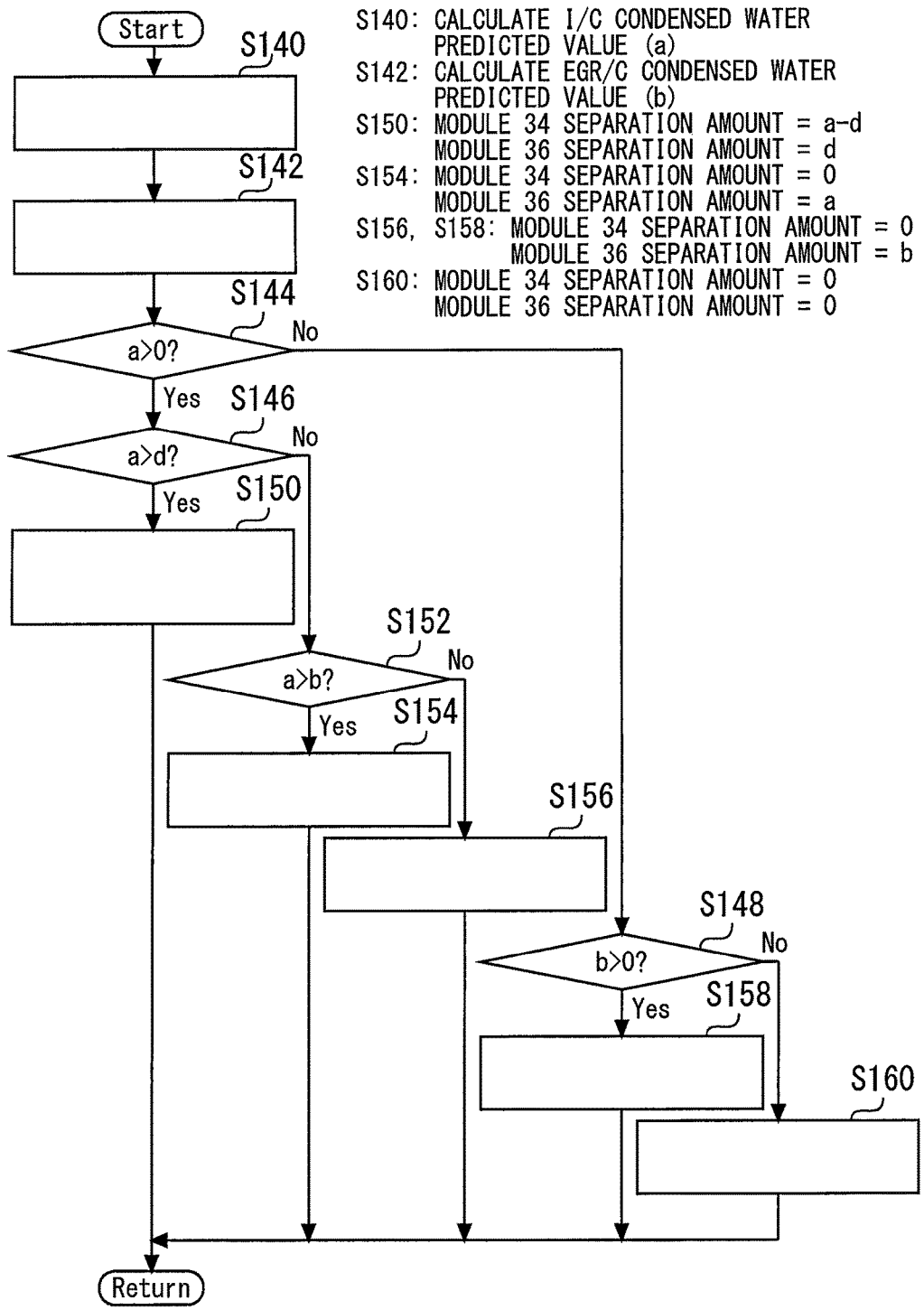
FIG. 11 is a flowchart illustrating an example of processing executed by the ECU 70 in the second embodiment of the present disclosure.

Specific processing for valve control will now be described referring to FIG. 10 and FIG. 11. FIG. 10 and FIG. 11 are flowcharts illustrating an example of processing executed by the ECU 70 in the second embodiment of the present disclosure. Note that, the routines illustrated in these drawings are repeatedly executed at each predetermined control period.

In the routine illustrated in FIG. 10, first, external air conditions are detected (step S100). In this step, the ECU 70 detects the atmospheric temperature $T_0$, the atmospheric pressure $P_0$ and the atmospheric humidity RH using the temperature sensor 72, the pressure sensor 73 and the humidity sensor 74.

Next, the engine operating state is detected (step S102). In this step, the ECU 70 detects information that is necessary for calculating a saturated water vapor flow rate $G_{H2Omax,I/C}$ and a water vapor flow rate $G_{H2O,I/C}$ of gas (fresh air or mixed gas) that flows immediately downstream of the intercooler 24, and a saturated water vapor flow rate $G_{H2Omax,EGR/C}$ and a water vapor flow rate $G_{H2O,EGR/C}$ of EGR gas that flows immediately downstream of the EGR cooler 32. Specifically, the ECU 70 detects the fresh air flow rate Ga, the pre-I/C temperature $T_{I/Cin}$, the pre-I/C pressure $P_{I/Cin}$, the post-I/C temperature $T_{I/Cout}$, pre-EGR/C temperature $T_{EGR/Cin}$, the pre-EGR/C pressure $P_{EGR/Cin}$ and the post-EGR/C temperature $T_{EGR/Cout}$. These parameters are acquired from the various sensors described above. Further, the ECU 70 detects an EGR gas flow rate $G_{EGR}$ that flows into the intake passage 12 from the EGR passage 28, and a fuel flow rate GF that is injected to the cylinders.

Next, a water vapor flow rate $G_{H2O,air}$ in the fresh air is calculated (step S104). The water vapor flow rate $G_{H2O,air}$ is a flow rate of water vapor included in fresh air that flows through the intake passage 12 on an upstream side relative to the module 34. In the present step, the ECU 70 calculates the water vapor flow rate $G_{H2O,air}$ based on values detected in step S100 or step S102 and the following equation (1).

Water vapor flow rate $G_{H2O,air}$ [g/s]=fresh air flow rate Ga [g/s]×(atmospheric saturated water vapor pressure [kPa]×atmospheric humidity RH/atmospheric pressure $P_0$)×($H_2O$ molecular weight [g/mol]/fresh air molecular weight [g/mol])     (1)

Note that, in equation (1), the fresh air molecular weight and the $H_2O$ molecular weight are set values, and the atmospheric saturated water vapor pressure is separately calculated based on the atmospheric temperature $T_0$ detected in step S100.

Next, whether or not EGR gas is being introduced is determined (step S106). In the present step, the ECU 70 determines whether or not EGR gas is being introduced into the intake passage 12 from the EGR passage 28 based on, for example, the engine speed and load. If it is determined as a result that EGR gas is being introduced ("Yes"), the process proceeds to step S108, while if it is determined that EGR gas is not being introduced ("No"), the process proceeds to step S116.

In step S108, a water vapor flow rate $G_{H2O,EGR}$ contained in the EGR gas is calculated. The water vapor flow rate $G_{H2O,EGR}$ is the flow rate of water vapor included in EGR gas that flows through the EGR passage 28 on the upstream side relative to the module 36. In the present step, the ECU 70 calculates the water vapor flow rate $G_{H2O,EGR}$ based on the detected values in step S100 or step S102 and the following equations (2) to (4).

Water vapor flow rate $G_{H2O,EGR}$ [g/s] =     (2)
    EGR gas flow rate $G_{EGR}$ [g/s] × proportion
    of water vapor in EGR gas × ($H_2O$ molecular
    weight [g/mol] / exhaust gas molecular weight [g/mol])

Proportion of water vapor in EGR gas =     (3)
    Proportion of water vapor in exhaust gas =
    water vapor flow rate $G_{H2O,CG}$ [g/s] of combustion
    gas / (fresh air flow rate Ga [g/s] + fuel flow rate GF[g/s])

Note that, the exhaust gas molecular weight in equation (2) and the fuel molecular weight in equation (4) are set values that are separately calculated based on the following reaction formula (5) when it is assumed that the fuel used is heptane, and the coefficient of the $H_2O$ molecular weight in equation (4) is also based on reaction formula (5). Naturally, the exhaust gas molecular weight in equation (2) and the fuel molecular weight in equation (4) change according to the fuel that is used.

$$C_7H_{16}+11O_2 \rightarrow 7CO_2+8H_2O \quad (5)$$

Next, a saturated water vapor flow rate $G_{H2Omax,I/C}$ and a saturated water vapor flow rate $G_{H2Omax,EGR/C}$ are calculated (steps S110 and S112). In these steps, the ECU 70 substitutes the values detected in step S100 or step S102 into the following equations (6) and (7) to calculate the saturated water vapor flow rate $G_{H2Omax,I/C}$ and the saturated water vapor flow rate $G_{H2Omax,EGR/C}$.

Saturated water vapor flow rate $G_{H2Omax,I/C}$=mixed
    gas flow rate [g/s]×(saturated water vapor pressure [kPa] of mixed gas/pre-I/C pressure $P_{I/Cin}$ [kPa])×($H_2O$ molecular weight [g/mol]/molecular weight of mixed gas [g/mol])     (6)

Saturated water vapor flow rate $G_{H2Omax,EGR/C}$=EGR
    gas flow rate [g/s]×(saturated water vapor pressure of EGR gas [kPa]/pre-EGR/C pressure $P_{EGR/Cin}$ [kPa])×($H_2O$ molecular weight [g/mol]/molecular weight of mixed gas [g/mol])     (7)

Note that, the molecular weight of mixed gas in equations (6) and (7) is a set value that is calculated based on the fresh air molecular weight and the exhaust gas molecular weight in equation (2). Further, the saturated water vapor pressure of mixed gas in equation (6) is separately calculated based on the post-I/C temperature $T_{I/Cout}$. Likewise, the saturated water vapor pressure of EGR gas in equation (7) is calculated based on the post-EGR/C temperature $T_{EGR/Cout}$.

Although the pressure of the gas on the downstream side of the intercooler 24 (hereunder, referred to as "post-I/C pressure") $P_{I/Cout}$ should be used instead of the pre-I/C pressure $P_{I/Cin}$ in equation (6) in order to make the partial water vapor pressure in gas (fresh air or mixed gas) on the downstream side of the intercooler 24 equal to the saturated water vapor pressure at the post-I/C temperature $T_{I/Cout}$, the reason for using the pre-I/C pressure $P_{I/Cin}$ is to set the worst conditions under which condensed water can be generated by adopting the pressure of mixed gas before cooling (that is, the pre-I/C pressure $P_{I/Cin}$) which is the pressure at the time that the pressure of mixed gas in the intake passage 12 becomes highest. For a similar reason, in equation (7) the pre-EGR/C pressure $P_{EGR/Cin}$ is used, and not the pressure of gas on the downstream side relative to EGR/C (hereunder, referred to as "post-EGR/C pressure") $P_{EGR/Cout}$. Consequently, in the present routine that uses equations (6) and (7), it is predicted whether the partial water vapor pressure in gas (fresh air or mixed gas) downstream of the intercooler 24 will be less than the saturated water vapor pressure at the post-I/C temperature $T_{I/Cout}$, and it is predicted whether the partial water vapor pressure in EGR gas downstream of the EGR cooler 32 will be less than the saturated water vapor pressure at the post-EGR/C temperature $T_{EGR/Cout}$. Note that, naturally the pre-I/C pressure $P_{I/Cin}$ may also be used as the post-I/C pressure $P_{I/Cout}$ in equation (6), and the pre-EGR/C pressure $P_{EGR/Cin}$ may be used as the post-EGR/C pressure $P_{EGR/Cout}$ in equation (7).

Next, a target separation amount of water vapor in each module is calculated (step S114). The details of the processing in the present step will be described referring to FIG. 11.

In the routine illustrated in FIG. 11, first, a predicted value a of condensed water that is generated accompanying cooling at the intercooler 24 is calculated (step S140). In the present step, the ECU 70 calculates the predicted value a by substituting the water vapor flow rate $G_{H2O,air}$ calculated in step S104, the water vapor flow rate $G_{H2O,EGR}$ calculated in step S108 and the saturated water vapor flow rate $G_{H2Omax,I/C}$ calculated in step S110 in FIG. 10 into the following equation (8).

Predicted value a [g/s]=(water vapor flow rate $G_{H2O,air}$ [g/s]+water vapor flow rate $G_{H2O,EGR}$ [g/s])−saturated water vapor flow rate $G_{H2Omax,I/C}$ [g/s]  (8)

Next, a predicted value b of condensed water that is generated accompanying cooling at the EGR cooler 32 is calculated (step S142). In the present step the ECU 70 calculates the predicted value b by substituting the water vapor flow rate $G_{H2O,EGR}$ calculated in step S108 and the saturated water vapor flow rate $G_{H2Omax,EGR/C}$ calculated in step S112 in FIG. 10 into the following equation (9).

Predicted value b [g/s]=water vapor flow rate $G_{H2O,EGR}$ [g/s]−saturated water vapor flow rate $G_{H2Omax,EGR/C}$ [g/s]  (9)

Next, the ECU 70 determines whether or not the relation a>0 holds with respect to the predicted value a calculated in step S140 (step S144). If it is determined as a result that the relation a>0 holds ("Yes"), it can be predicted that condensed water will be generated accompanying cooling at the intercooler 24 unless moisture is removed at the module 34, and hence the process proceeds to step S146. On the other hand, if it is determined that the relation a>0 does not hold ("No"), it can be predicted that condensed water will not be generated accompanying cooling at the intercooler 24 even if moisture is not removed at the module 34, and hence the process proceeds to step S148.

In step S146, it is determined whether or not the relation a>d holds with respect to the predicted value a calculated in step S140. The value that is compared with the predicted value a in the present step is a separation limit value d of the module 36, specifically, a value that is set based on the following equation (10).

Separation limit value d [g/s]=permeability coefficient $P_{H2O,EGR}$ [g/(s·m·kPa)]×film area $A_{EGR}$ [m²]×maximum differential pressure $\Delta P_{H2Omax,EGR}$ [kPa] of partial water vapor pressure/film thickness $\delta_{EGR}$ [m]  (10)

Note that, the permeability coefficient $P_{H2O,EGR}$ in equation (10) is a unique coefficient of the tubular film 48 described above referring to FIG. 2. Further, the film area $A_{EGR}$ and the film thickness $\delta_{EGR}$ correspond to the film area and film thickness of the tubular film 48, respectively. Further, the maximum differential pressure $\Delta P_{H2Omax,EGR}$ corresponds to a partial water vapor pressure difference that arises between the two spaces separated by the tubular film 48 at a time that a gas amount which is sent from the pressure reducing pump 44 is made a maximum amount.

If it is determined that the relation a>d holds in step S146 ("Yes"), since it can be predicted that removal of moisture is required at both of the modules 34 and 36, the process proceeds to step S150. In step S150, the target separation amount of water vapor at the module 36 is set to a value that is equal to the separation limit value d, and the target separation amount of water vapor at the module 34 is set to a value that is equal to the difference between the predicted value a and the separation limit value d. In contrast, if it is determined that the relation a>d does not hold in step S146 ("No"), it can be predicted that if moisture is removed at the module 36, even if moisture is not removed at the module 34, condensed water will not be generated accompanying cooling at the intercooler 24, and hence the process proceeds to step S152.

In step S152, the ECU 70 determines whether or not the relation a>b holds with respect to the predicted value a calculated in step S140 and the predicted value b calculated in step S142. If it is determined as a result that the relation a>b holds ("Yes"), since it can be predicted that condensed water will not be generated accompanying cooling at the intercooler 24 if a large amount of moisture is removed beforehand at the module 36, the process proceeds to step S154 in which the target separation amount of water vapor at the module 36 is set to a value that is equal to the predicted value a and the target separation amount of water vapor at the module 34 is set to zero. In contrast, if it is determined that the relation a>b does not hold ("No"), the process proceeds to step S156 in which the target separation amount of water vapor at the module 36 is set to a value that is equal to the predicted value b and the target separation amount of water vapor at the module 34 is set to zero.

In step S148, the ECU 70 determines whether or not the relation b>0 holds with respect to the predicted value b calculated in step S142. If it is determined as a result that the relation b>0 holds ("Yes"), since it can be predicted that condensed water will be generated accompanying cooling at the EGR cooler 32 unless moisture is removed at the module 36, the process proceeds to step S158 in which the target separation amount of water vapor at the module 36 is set to a value that is equal to the predicted value b and the target separation amount of water vapor at the module 34 is set to zero. In contrast, if it is determined that the relation b>0 does not hold ("No"), since it can be predicted that condensed water will not be generated accompanying cooling at the EGR cooler 32 even if moisture is not removed at the module 36, the process proceeds to step S160 in which the target separation amount of water vapor at both of the modules 34 and 36 is set to zero.

Returning to FIG. 10, in steps S116 to S120, a target separation amount of water vapor at each module in a case in which EGR gas is not introduced into the intake passage 12 is calculated. Specifically, in step S116, the target separation amount of water vapor at the module for EGR gas, that is, the module 36, is set to zero. The reason is simply that EGR gas is not introduced. Next, in step S118, the saturated water vapor flow rate $G_{H2Omax,I/C}$ is calculated. The processing in the present step is the same as the processing in step S110. Next, in step S120, the target separation amount of water vapor at the module for fresh air, that is, the module 34, is calculated by substituting the water vapor flow rate $G_{H2O,I/C}$ calculated in step S104 and the saturated water vapor flow rate $G_{H2Omax,I/C}$ calculated in step S118 into the following equation (11) (step S120).

Target separation amount of water vapor at module $34 = G_{H2O,I/C}$ [g/s]−$G_{H2Omax,I/C}$ [g/s]  (11)

Following step S114 or step S120, a target partial water vapor pressure difference at each module is calculated (step S122). In the present step, the ECU 70 substitutes the target separation amount calculated in step S114 when there is introduction of EGR gas into the following equations (12) and (13) to thereby calculate the target partial water vapor pressure difference at each module. When there is no introduction of EGR gas, the ECU 70 substitutes the target separation amount calculated at step S120 into the following equation (12) to thereby calculate the target partial water vapor pressure difference at the module 34.

Target partial water vapor pressure difference [kPa] at module 34=target separation amount of water vapor [g/s] at module 34×film thickness $\delta_{air}$ [m]/permeability coefficient $P_{H2O,air}$ [g/(s·m·kPa)]/film area $A_{air}$ [m$^2$] (12)

Target partial water vapor pressure difference [kPa] at module 36=target separation amount of water vapor [g/s] at module 36×film thickness $\delta_{EGR}$ [m]/permeability coefficient $P_{H2O,EGR}$ [g/(s·m·kPa)]/film area $A_{EGR}$ [m$^2$] (13)

Note that, the permeability coefficient $P_{H2O,air}$ in equation (12) is the same value as the permeability coefficient $P_{H2O,EGR}$ in equation (13). Further, the film thickness $\delta_{air}$ and the film area $A_{air}$ in equation (12) are the same values as the film area $A_{EGR}$ and the film thickness $\delta_{EGR}$ in equation (13), respectively.

Next, the ECU 70 calculates a target pressure reduction amount at each module (step S124). In the present step, the ECU 70 substitutes the target partial water vapor pressure difference for each module calculated in step S122 and the like into the following equations (14) and (15) to thereby calculate the target pressure reduction amount at each module.

Target pressure reduction amount [kPa] at module 34=target partial water vapor pressure difference [kPa] at module 34-atmospheric pressure $P_0$ [kPa]×atmospheric humidity RH (14)

Target pressure reduction amount [kPa] at module 36=target partial water vapor pressure difference [kPa] at module 36-pre-EGR/C pressure $P_{EGR/Cin}$ [kPa]×proportion of water vapor in EGR gas (15)

Note that, the proportion of water vapor in EGR gas in equation (15) is calculated based on equation (3).

Next, the opening degree of each control valve is adjusted (step S126). In the present step, the ECU 70 adjusts the respective opening degrees of the control valves 60 and 62 by feedback control until reaching the target pressure reduction amounts for each module that were calculated in step S124.

As described above, according to the routines illustrated in FIG. 10 and FIG. 11, when the partial water vapor pressure in gas (fresh air or mixed gas) downstream of the intercooler 24 is higher than the saturated water vapor pressure at the pre-I/C temperature $T_{I/Cin}$, the partial water vapor pressure in the aforementioned gas (fresh air or mixed gas) can be made equal to the saturated water vapor pressure at the pre-I/C temperature $T_{I/Cin}$. Since the post-I/C temperature $T_{I/Cout}$ is lower than the pre-I/C temperature $T_{I/Cin}$, the saturated water vapor pressure at the post-I/C temperature $T_{I/Cout}$ becomes lower than the saturated water vapor pressure at the pre-I/C temperature $T_{I/Cin}$. Therefore, according to the routines illustrated in FIG. 10 and FIG. 11 which can make the partial water vapor pressure in gas (fresh air or mixed gas) downstream of the intercooler 24 equal to the saturated water vapor pressure at the pre-I/C temperature $T_{I/Cin}$, the partial water vapor pressure in the aforementioned gas (fresh air or mixed gas) can be made substantially equal to the saturated water vapor pressure at the post-I/C temperature $T_{I/Cout}$. Therefore, an increase in the amount of generated NOx can be suppressed while suppressing the generation of condensed water accompanying cooling at the intercooler 24.

In the routines illustrated in FIG. 10 and FIG. 11, when the pre-I/C pressure $P_{I/Cin}$ in equation (6) is replaced with the post-I/C pressure $P_{I/Cout}$, when the partial water vapor pressure in gas (fresh air or mixed gas) downstream of the intercooler 24 is higher than the saturated water vapor pressure at the post-I/C temperature $T_{I/Cout}$, the partial water vapor pressure in the aforementioned gas (fresh air or mixed gas) can be made equal to the saturated water vapor pressure at the post-I/C temperature $T_{I/Cout}$.

Further, according to the routines illustrated in FIG. 10 and FIG. 11, even when the partial water vapor pressure in gas (fresh air or mixed gas) downstream of the intercooler 24 is equal to or less than the saturated water vapor pressure at the pre-I/C temperature $T_{I/Cin}$, when the partial water vapor pressure in EGR gas downstream of the EGR cooler 32 is higher than the saturated water vapor pressure at the pre-EGR/C temperature $T_{EGR/Cin}$, the partial water vapor pressure in the EGR gas can be made equal to the saturated water vapor pressure at the pre-EGR/C temperature $T_{EGR/Cin}$. Since the post-EGR/C temperature $T_{EGR/Cout}$ is lower than the pre-EGR/C temperature $T_{EGR/Cin}$, the saturated water vapor pressure at the post-EGR/C temperature $T_{EGR/Cout}$ becomes lower than the saturated water vapor pressure at the pre-EGR/C temperature $T_{EGR/Cin}$. Therefore, according to the routines illustrated in FIG. 10 and FIG. 11 which can make the partial water vapor pressure in EGR gas downstream of the EGR cooler 32 equal to the saturated water vapor pressure at the pre-EGR/C temperature $T_{EGR/Cin}$, the partial water vapor pressure in the aforementioned EGR gas can be made substantially equal to the saturated water vapor pressure at the post-EGR/C temperature $T_{EGR/Cout}$. Thus, generation of condensed water accompanying cooling at the EGR cooler 32 can also be suppressed.

Note that, in the routines illustrated in FIG. 10 and FIG. 11, when the pre-EGR/C pressure $P_{EGR/Cin}$ in equation (7) is replaced with the post-EGR/C pressure $P_{EGR/Cout}$, when the partial water vapor pressure in EGR gas downstream of the EGR cooler 32 is higher than the saturated water vapor pressure at the post-EGR/C temperature $T_{EGR/Cout}$, the aforementioned partial water vapor pressure can be made equal to the saturated water vapor pressure at the post-EGR/C temperature $T_{EGR/Cout}$.

Note that, in the above described second embodiment, a "pressure reduction amount adjustment portion" of the present disclosure is realized by the ECU 70 executing processing of the routines illustrated in FIG. 10 and FIG. 11.

Figure 12:
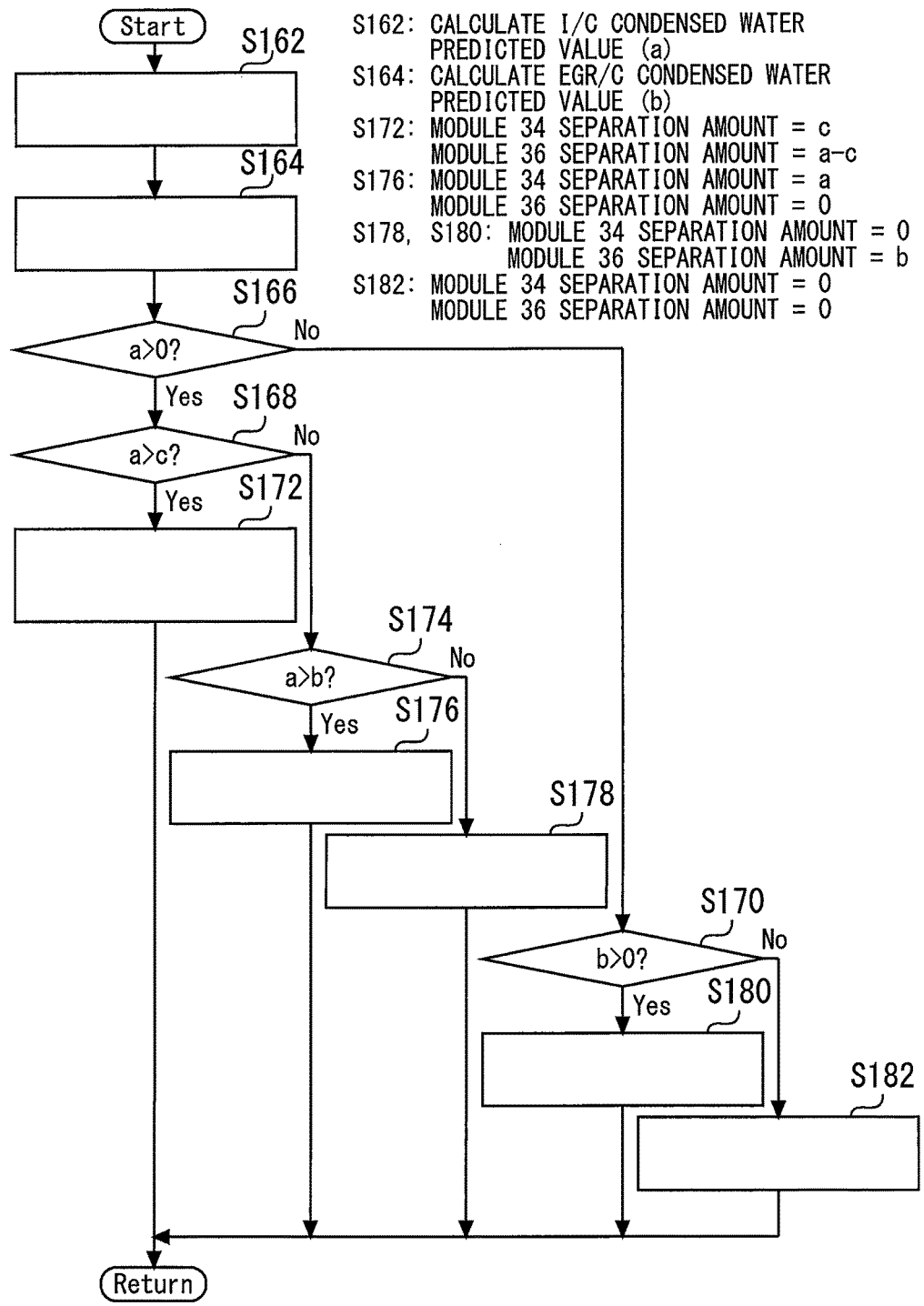
FIG. 12 is a flowchart illustrating an example of processing executed by the ECU 70 in a case of calculating a target separation amount of water vapor at the modules 34 and 36 utilizing a separation limit value c.

Another Example of Calculation of Target Separation Amount of Water Vapor of Each Module In the above described second embodiment, in the routine shown in FIG. 11, the separation limit value d of the module 36 is combined with the predicted values a and b to calculate the target separation amounts of water vapor at the modules 34 and 36. However, the target separation amounts of water vapor at the modules 34 and 36 may be calculated using a separation limit value c of the module 34 instead of the separation limit value d. FIG. 12 is a flowchart illustrating an example of processing executed by the ECU 70 in the case of calculating the target separation amount of water vapor at the modules 34 and 36 using the separation limit value c.

The processing in steps S162 to S166 and steps S170 and S174 to S182 shown in FIG. 12 is the same as the processing in steps S140 to S144 and steps S148 and S152 to S160 shown in FIG. 11. A first difference between the processing in FIG. 11 and the processing in FIG. 12 is that the value compared with the predicted value a in step S168 is the separation limit value c. Specifically, the separation limit value c is set based on the following equation (16).

Separation limit value $c$ [g/s]=permeability coefficient $P_{H2O,air}$ [g/(s·m·kPa)]×film area $A_{air}$ [m²]× maximum differential pressure $\Delta P_{H2Omax,air}$ [kPa] of partial water vapor pressure/film thickness $\delta_{air}$ [m]     (16)

Note that, the maximum differential pressure $\Delta P_{H2Omax,air}$ in equation (16) corresponds to a partial water vapor pressure difference that arises between the two spaces that are separated by the tubular film 48 at a time that the gas amount that is sent from the pressure reducing pump 40 is made the maximum amount.

A second difference between the processing in FIG. 11 and the processing in FIG. 12 is that when it is determined in step S168 that the relation a>c holds ("Yes"), the target separation amount of water vapor at the module 34 is set to a value that is equal to the separation limit value c, and the target separation amount of water vapor at the module 36 is set to a value that is equal to a difference between the predicted value a and the separation limit value c.

As described above, the target separation amount of water vapor at the modules 34 and 36 can also be calculated by combining the separation limit value c of the module 36 with the predicted values a and b, instead of the separation limit value d. According to the routine shown in FIG. 11, an insufficient amount at the module 34 can be compensated for while removing the maximum amount of moisture at the module 36. According to the routine illustrated in FIG. 12, an insufficient amount at the module 36 can be compensated for while removing the maximum amount of moisture at the module 34.

That is to say, the target separation amounts of water vapor at the modules 34 and 36 can also be calculated by combining the separation limit values c and d. When processing is performed in accordance with the routine shown in FIG. 11 (or FIG. 12), cases arise in which the maximum amount of moisture is removed at the module 36 (at the module 34 in the case of the routine illustrated in FIG. 12) (see step S150 in FIG. 11 or step S172 in FIG. 12). Because water vapor separation is accompanied by driving of the pressure reducing pumps 40 and 44, performing maximum moisture removal at the module 36 (at the module 34 in the case of the routine illustrated in FIG. 12) is not desirable since it is linked to an increase in energy consumption. In this respect, since the configurations of the modules 34 and 36 are identical, it is possible to perform moisture removal in which the sum total of driving energy of the pressure reducing pumps 40 and 44 is minimized, by combining the separation limit values c and d and calculating target separation amounts so that a predicted value a+b which is obtained by adding the predicted value a calculated in step S140 and the predicted value b calculated in step S142 in FIG. 11 is evenly shared between the modules 34 and 36.

Example of Calculation of Target Separation Amounts of Water Vapor at Modules in Case where Another Configuration Example of Internal Combustion Engine is Applied In a case of applying the valve control of the above described second embodiment to the non-EGR supercharging system mentioned in the above first embodiment, after removing the EGR passage 28, the EGR cooler 32, the module 36, the temperature sensors 78 and 80, and the pressure sensor 79 and the like from the configuration illustrated in FIG. 8, processing that is the same as when EGR gas is not introduced into the intake passage 12 may be performed. Specifically, the target separation amount of water vapor at the module 34 may be calculated by skipping the processing in step S106 in FIG. 11 and performing the processing from steps S100 to S104 and the processing from steps S116 to S120.

In the case of applying the valve control of the above described second embodiment to the non-supercharging EGR system mentioned in the foregoing first embodiment, the target separation amount of water vapor of the modules may be calculated in accordance with the engine configuration. Specifically, in the case of an engine configuration equipped with the modules 34 and 36, after removing the turbocharger 18, the intercooler 24, the temperature sensors 75 and 77 and the pressure sensor 76 and the like from the configuration shown in FIG. 8, in the processing illustrated in FIG. 10 and FIG. 11, it is sufficient to skip the processing relating to cooling at the intercooler 24. Specifically, it is sufficient to skip steps S116, S118 and S120 in FIG. 10 and step S140 in FIG. 11, and to perform processing in which the predicted value a is replaced with the predicted value b in the processing of steps S144, S146 and S150 in FIG. 11. Further, after replacing the predicted value a with the predicted value b, if it is determined in step S146 that the relation b<d holds ("No"), it is sufficient to set the target separation amount of water vapor at the module 36 to a value that is equal to the separation limit value d, and to set the target separation amount of water vapor at the module 34 to zero.

In contrast, in the case of an engine configuration equipped with the module 36 only, after removing the turbocharger 18, the intercooler 24, the module 34, the temperature sensors 75 and 77 and the pressure sensor 76 and the like from the configuration shown in FIG. 8, in the processing illustrated in FIG. 10 and FIG. 11, it is sufficient to skip the processing relating to cooling at the intercooler 24 and the processing relating to calculation of the target separation amount of the module 34. Specifically, it is sufficient to cancel steps S110, S118 and S120 in FIG. 10 and also cancel the processing other than the processing in step S142 in FIG. 11, and when EGR gas is introduced into the intake passage 12 (when the determination in step S106 is "Yes"), to set the predicted value b calculated in step S142 in FIG. 11 as the target separation amount of water vapor at the module 36, and when EGR gas is not introduced into the intake passage 12 (when the determination in step S106 is "No"), to set the target separation amount of water vapor at the module 36 to zero.

What is claimed is:
1. An internal combustion engine, comprising:
a gas passage through which gas flows that flows into a combustion chamber;
a cooling portion which is provided in the gas passage and which cools the gas that flows into the combustion chamber;
a water vapor separating portion that constitutes one part of the gas passage on an upstream side in a gas flow direction relative to the cooling portion, and that comprises a water vapor permeable film which separates two spaces which have different partial water vapor pressures; and allows water vapor to permeate from a space in which a partial water vapor pressure is higher toward a space in which a partial water vapor pressure is lower; and a pressure reducing portion which reduces a partial water vapor pressure of an outer space which is separated from an inner space into which gas from the gas passage flows by the water vapor permeable film so that a difference in partial water vapor pressures arises between the inner space and the outer space.

2. The internal combustion engine according to claim 1, further comprising a pressure reduction amount adjustment portion configured to adjust a pressure reduction amount of the partial water vapor pressure in the outer space that is reduced by the pressure reducing portion in response to a prediction that a relative humidity on a downstream side in the gas flow direction relative to the cooling portion in the gas passage will be higher than 100%, so that the relative humidity becomes substantially equal to 100%.

3. The internal combustion engine according to claim 1, further comprising a pressure reduction amount adjustment portion configured to increase a pressure reduction amount of the partial water vapor pressure in the outer space as a humidity of fresh air that flows into the combustion chamber rises.

4. The internal combustion engine according to claim 3, wherein the pressure reduction amount adjustment portion is configured to increase the pressure reduction amount as a pressure on a downstream side in the gas flow direction relative to a compressor of a turbocharger which is provided in the gas passage rises.

5. The internal combustion engine according to claim 3, wherein the pressure reduction amount adjustment portion is configured to increase the pressure reduction amount as a temperature of cooling water that is caused to exchange heat at the cooling portion with gas that flows into the combustion chamber decreases.

6. The internal combustion engine according claim 3, wherein the pressure reduction amount adjustment portion is configured to increase the pressure reduction amount as a flow rate of cooling water that is caused to exchange heat at the cooling portion with gas that flows into the combustion chamber rises.

7. The internal combustion engine according to claim 1, wherein the gas passage is an EGR passage which connects an intake passage and an exhaust passage;
the cooling portion is an EGR cooler that cools EGR gas which flows through the EGR passage; and
the water vapor separating portion constitutes one part of the EGR passage on an upstream side in the gas flow direction relative to the EGR cooler of the EGR passage.

8. The internal combustion engine according to claim 1, wherein the gas passage is an intake passage in which a compressor of a turbocharger is provided;
the cooling portion is an intercooler that cools gas which is compressed by the compressor; and
the water vapor separating portion constitutes one part of the intake passage on an upstream side in the gas flow direction relative to the compressor of the intake passage.

9. The internal combustion engine according to claim 1, wherein the gas passage is an intake passage in which a compressor of a turbocharger is provided, and an EGR passage which connects an upstream side of the intake passage in a gas flow direction relative to the compressor and a downstream side of an exhaust passage in a gas flow direction relative to a turbine of the turbocharger;
the cooling portion is an intercooler which cools gas that is compressed by the compressor, and an EGR cooler which cools EGR gas that flows in the EGR passage; and
the water vapor separating portion comprises one part of the intake passage that is on an upstream side in the gas flow direction relative to a connecting portion with the EGR passage of the intake passage, and also comprises one part of the EGR passage that is on an upstream side in the gas flow direction relative to the EGR cooler of the EGR passage.

* * * * *